US012624757B2

(12) United States Patent　(10) Patent No.:　US 12,624,757 B2

Asano et al.　(45) Date of Patent:　May 12, 2026

(54) PARKING LOCK DEVICE

(71) Applicant: AISIN CORPORATION, Kariya (JP)

(72) Inventors: Koichi Asano, Kariya (JP); Masahiro Tsuruta, Kariya (JP); Yasuhiro Tominaga, Kariya (JP); Motoki Ogata, Kariya (JP)

(73) Assignee: AISIN CORPORATION

( * ) Notice: Subject to any disclaimer, the term of this patent is extended or adjusted under 35 U.S.C. 154(b) by 0 days.

(21) Appl. No.: 19/206,712

(22) Filed: May 13, 2025

(65) Prior Publication Data

US 2025/0369514 A1　Dec. 4, 2025

(30) Foreign Application Priority Data

May 30, 2024　(JP) ................................. 2024-087602

(51) Int. Cl.
*F16H 63/34*　(2006.01)

(52) U.S. Cl.
CPC ..... *F16H 63/3466* (2013.01); *F16H 63/3433* (2013.01)

(58) Field of Classification Search
CPC ............. F16H 63/3466; F16H 63/3433; F16H 63/3491
See application file for complete search history.

(56) References Cited

U.S. PATENT DOCUMENTS

| | | | | |
|---|---|---|---|---|
| 2017/0234427 A1* | 8/2017 | Hofkirchner | ....... | F16H 63/3425 |
| | | | | 192/219.5 |
| 2020/0248806 A1* | 8/2020 | Klein | .................. | F16H 63/3433 |
| 2021/0310558 A1* | 10/2021 | Jo | ........................ | F16H 63/3433 |
| 2023/0145682 A1* | 5/2023 | Mandery | ............. | F16H 63/3475 |
| | | | | 192/219.5 |
| 2023/0349464 A1* | 11/2023 | Haschke | ............. | F16H 63/3466 |
| 2024/0011560 A1* | 1/2024 | Morise | ................ | F16H 63/3433 |

FOREIGN PATENT DOCUMENTS

JP　2008174188 A　7/2008

* cited by examiner

*Primary Examiner* — Lori Wu

(74) *Attorney, Agent, or Firm* — BUCHANAN INGERSOLL & ROONEY PC

(57)　ABSTRACT

A parking lock device includes: an electric motor; and a mechanism including a lock member configured to detachably engage with a parking gear and operate based on output from the electric motor. The mechanism includes a first mechanism part configured to switch a state of the parking gear between a locked state and an unlocked state by moving the lock member based on output from the electric motor, and a second mechanism part configured to switch a state of the parking gear from a locked state to an unlocked state by moving the lock member based on an external input generated manually. When the parking gear is in a locked state, in the first mechanism part, a relation between the second mechanism part and the electric motor is switchable between connection and disconnection with the second mechanism part on the basis of an output from the electric motor.

4 Claims, 12 Drawing Sheets

*FIG. 9*

PARKING LOCK DEVICE

CROSS REFERENCE TO RELATED APPLICATIONS

This application is based on and claims priority under 35 U.S.C. § 119 to Japanese Patent Application No. 2024-087602, filed on May 30, 2024, the entire content of which is incorporated herein by reference.

TECHNICAL FIELD

The present disclosure relates to a parking lock device.

BACKGROUND DISCUSSION

There is known a technique of, in a parking lock device, separating power transmission between an actuator (electric motor) and a mechanism part by using a clutch provided between the actuator and the mechanism part, in order to reduce operation force required when manually switching from a locked state to an unlocked state (for example, JP 2008-174188 A).

However, in a conventional technique as described above, a clutch is required, and thus may have a problem of an increase in the number of parts.

A need thus exists for a parking lock device which is not susceptible to the drawback mentioned above.

SUMMARY

A parking lock device includes: an electric motor; and a mechanism including a lock member configured to detachably engage with a parking gear and operate on the basis of an output from the electric motor. The mechanism includes a first mechanism part configured to switch a state of the parking gear between a locked state and an unlocked state by moving the lock member on the basis of an output from the electric motor, and a second mechanism part configured to switch a state of the parking gear from a locked state to an unlocked state by moving the lock member on the basis of an external input generated manually. When the parking gear is in a locked state, in the first mechanism part, a relation between the second mechanism part and the electric motor is switchable between connection and disconnection with the second mechanism part on the basis of an output from the electric motor.

BRIEF DESCRIPTION OF THE DRAWINGS

The foregoing and additional features and characteristics of this disclosure will become more apparent from the following detailed description considered with the reference to the accompanying drawings, wherein:

FIG. 9 is a plan view of a main part of the first mechanism part according to the second embodiment, as viewed from top;

DESCRIPTION OF EMBODIMENTS

Figure 1:
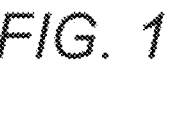
FIG. 1 is a diagram schematically showing a main part of a parking lock device according to the present embodiment (locked state)

Hereinafter, each embodiment will be described in detail with reference to the accompanying drawings. Dimension ratios in the drawings are merely examples and are not limited thereto, and shapes and the like in the drawings may be partially exaggerated for convenience of description. Furthermore, in the drawings, simply some of a plurality of parts having the same attribute may be denoted by reference signs for the sake of clarity.

In the following description, "connection" means "mechanical connection" and means connection in a connection form capable of power transmission unless otherwise specified.

Figure 2:
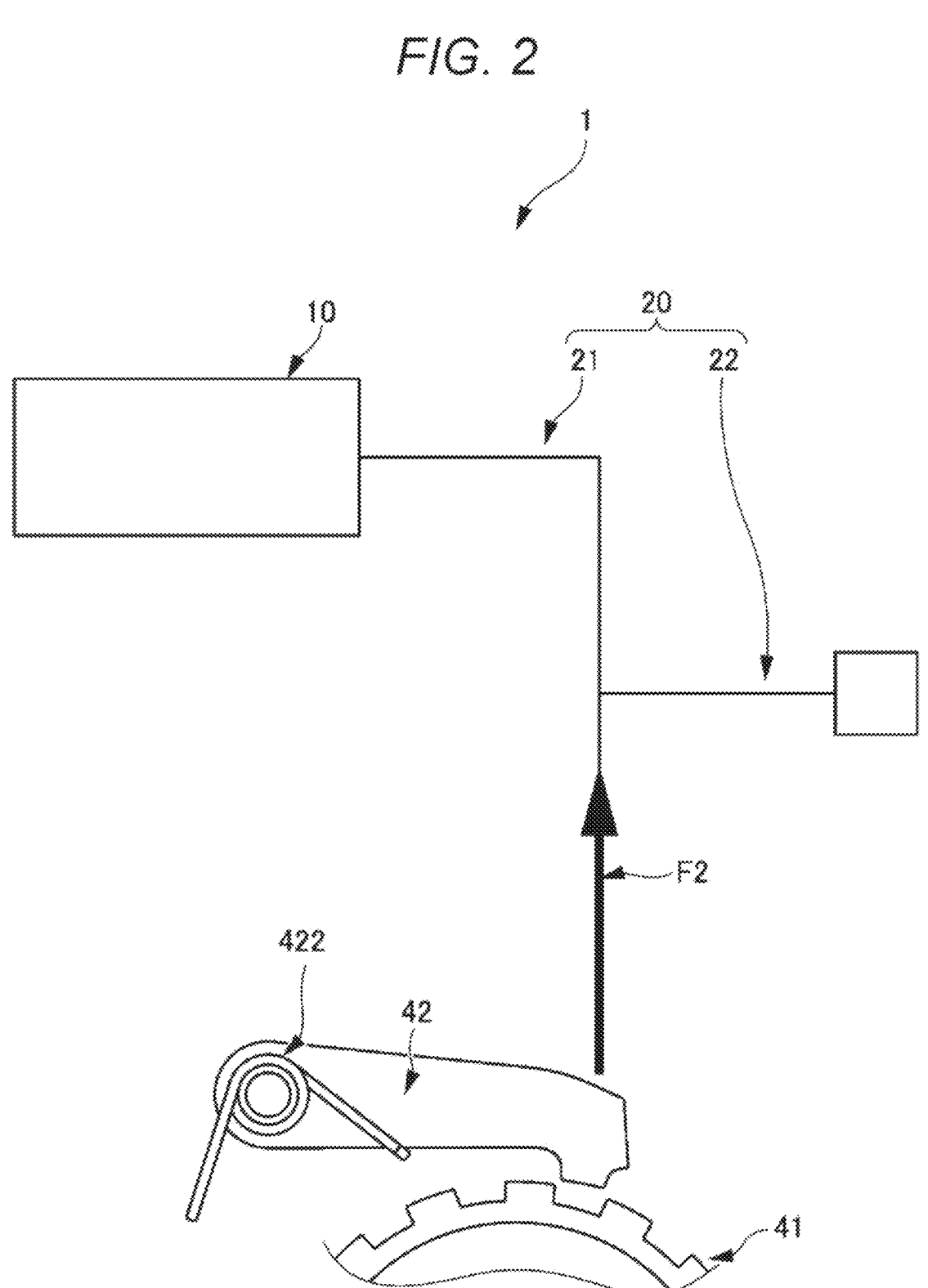
FIG. 2 is a diagram schematically showing the main part of the parking lock device according to the present embodiment (unlocked state)

FIGS. 1 and 2 are diagrams schematically showing a main part of a parking lock device 1 according to the present embodiment. FIG. 1 shows a locked state, and FIG. 2 shows an unlocked state. In FIGS. 1 and 2, a mechanism 20 described below is shown very schematically.

The parking lock device 1 includes an electric motor 10 and the mechanism 20.

The electric motor 10 is controlled by a control device (not shown). The electric motor 10 generates a rotational output at a time of driving. The electric motor 10 is connected to the mechanism 20 so that the rotational output can be transmitted to the mechanism 20.

The mechanism 20 includes a first mechanism part 21 and a second mechanism part 22.

The first mechanism part 21 switches a state of a parking gear 41 between the locked state (FIG. 1) and the unlocked state (FIG. 2) by moving a parking pawl 42 on the basis of an output from the electric motor 10. Specifically, the first mechanism part 21 generates force F1 (refer to FIG. 1) that forms a state in which the parking pawl 42 is engaged with the parking gear 41. The first mechanism part 21 also generates force F2 (refer to FIG. 2) on the basis of an output from the electric motor 10, for releasing the parking pawl 42 in the state of being engaged with the parking gear 41. The force F2 may be directly generated on the basis of the output from the electric motor 10 or may be indirectly generated on the basis of the output from the electric motor 10. The force F2 may be force that reduces magnitude of the above-described force F1 acting on the parking pawl 42.

The second mechanism part 22 switches the state of the parking gear 41 between the locked state (FIG. 1) and the unlocked state (FIG. 2) by moving the parking pawl 42 on the basis of an external input generated manually. The second mechanism part 22 also generates the force F2 (refer to FIG. 2) on the basis of the external input generated manually, for detaching the parking pawl 42 in the state of being engaged with the parking gear 41. The force F2 may be force that reduces magnitude of the above-described force F1 acting on the parking pawl 42.

The second mechanism part 22 may be formed independently of the first mechanism part 21, but may be formed in such a manner as to share a part of the first mechanism part 21. In the examples shown in FIGS. 1 and 2, as schematically shown, the second mechanism part 22 is formed in such a manner as to share a part of the first mechanism part 21 (a part terminating at the parking pawl 42). The second mechanism part 22 is connected to the electric motor 10 in a situation where there is no gap Δ to be described later.

In the present embodiment, when the parking gear 41 is in the locked state (FIG. 1), the gap Δ is formed in the first mechanism part 21 of the mechanism 20 in such a manner that the electric motor 10 is mechanically separated from the second mechanism part 22. In the present embodiment, the gap Δ is formed on the basis of the output from the electric motor 10 without using a special gap-forming mechanism (special device) such as a clutch. Specifically, the gap Δ is formed by moving one of two members forming a power transmission path so as to be away from another member on the basis of the output from the electric motor 10.

When the gap Δ is formed, the electric motor 10 is mechanically separated from the second mechanism part 22. That is, the second mechanism part 22 and the electric motor 10 cannot transmit power to each other. As a result, it is possible to reduce force (refer to the force F2 in FIG. 2) required when the state of the parking gear 41 is manually switched from the locked state (FIG. 1) to the unlocked state (FIG. 2). That is, in a case of a configuration in which an output member 2100 of a linear motion mechanism 210 (refer to FIG. 3) and the parking gear 41 are integrated, it is necessary to apply an external input (operation force) opposing reaction force of the electric motor 10 at a time of manual operation, and necessary operation force (correlated with magnitude of the force F2 in FIG. 2) increases by that amount. Meanwhile, if the output member 2100 of the linear motion mechanism 210 and the parking gear 41 are separate bodies, it is not necessary to oppose the reaction force of the electric motor 10, and it is possible to reduce the necessary operation force (correlated with the magnitude of the force F2 in FIG. 2) by that amount.

In the present embodiment, when the state of the parking gear 41 is switched from the locked state (FIG. 1) to the unlocked state (FIG. 2) not manually but electrically, the following operation is performed. That is, the gap Δ is first eliminated by driving the electric motor 10, and then the parking pawl 42 is moved on the basis of the output from the electric motor 10 to form the unlocked state of the parking gear 41.

Thus, according to the present embodiment, in the parking lock device 1, it is possible to reduce the operation force required when manually switching from the locked state to the unlocked state, without using a special gap-forming mechanism such as a clutch. Therefore, in the parking lock device 1, it is possible to reduce the operation force required when manually switching from the locked state to the unlocked state, while reducing the number of parts.

According to the present embodiment, by forming (maintaining) the gap Δ when the parking gear 41 is in the locked state, load input to an output shaft of the electric motor 10 (load input via the linear motion mechanism 210) at a time of ratcheting can be eliminated.

Next, further details of the present embodiment will be described with reference to FIG. 3 and subsequent drawings.

Figure 3:
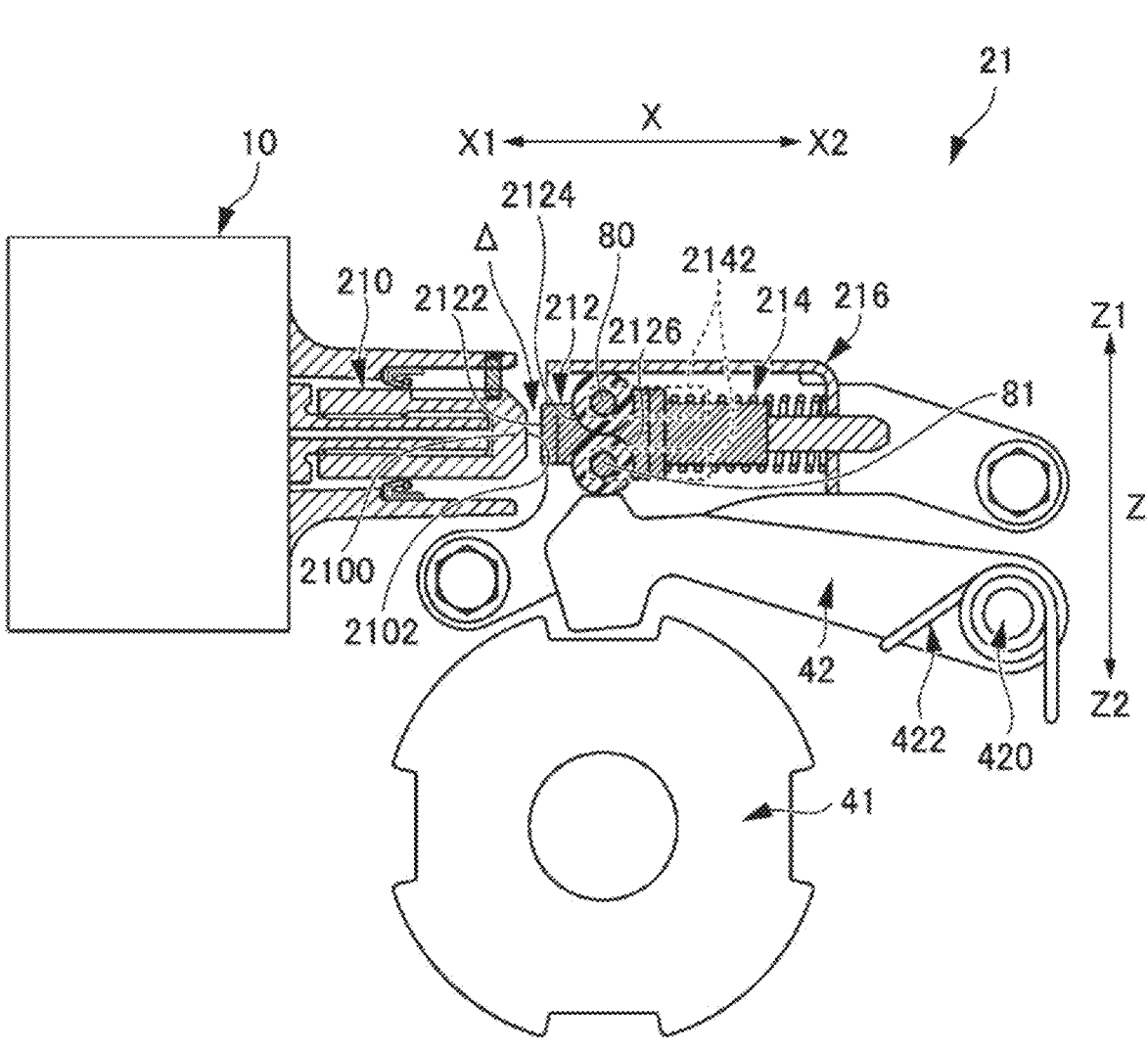
FIG. 3 is a view showing an example of a first mechanism part according to a first embodiment (locked state)
Figure 4:
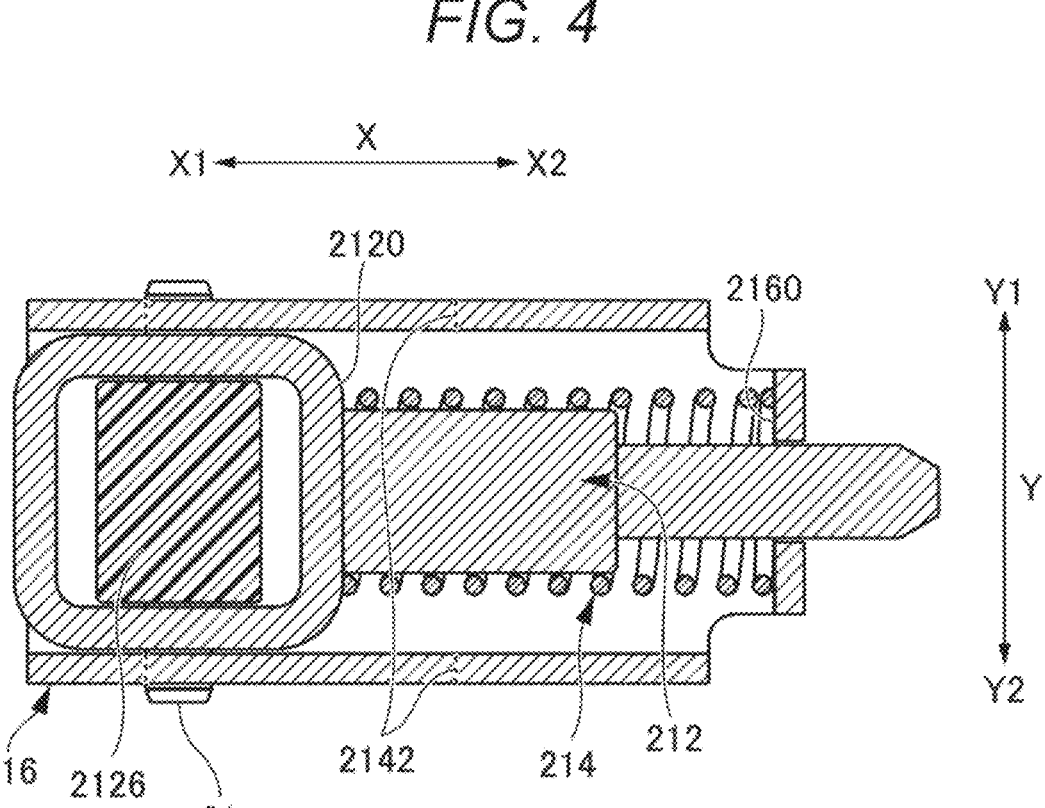
FIG. 4 is a plan view of a main part of the first mechanism part according to the first embodiment, as viewed from below.
Figure 5:
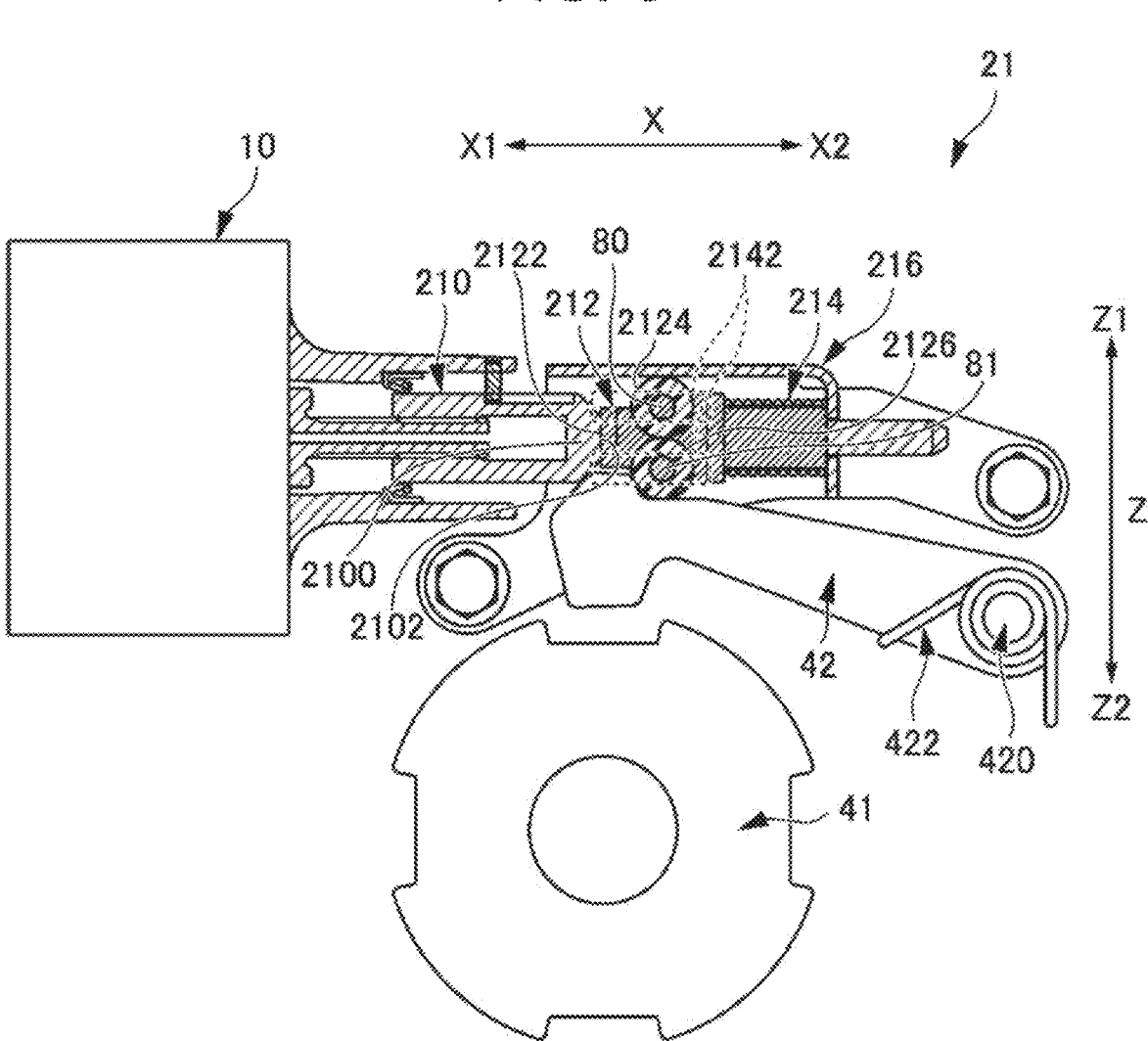
FIG. 5 is a view showing an example of the first mechanism part according to the first embodiment (unlocked state)

FIGS. 3 to 5 are views showing an example of the first mechanism part 21 of the present embodiment. FIG. 3 shows the parking gear 41 in the locked state, and FIG. 5 shows the parking gear 41 in the unlocked state. FIG. 4 is a plan view of a main part of the first mechanism part 21 as viewed from below. FIGS. 3 and 5 show the electric motor 10, the parking pawl 42, and the like together with the first mechanism part 21.

In FIG. 3, an X1 side and an X2 side are defined together with an X direction (an example of a first direction), and a Z1 side and a Z2 side are defined together with a Z direction (an example of a second direction). Here, for convenience of description, the Z direction is defined as a vertical direction, the Z1 side is defined as an upper side, and the Z2 side is defined as a lower side. The X direction is parallel to a direction in which a rotation axis of the electric motor 10 extends. In FIG. 4, a Y1 side and a Y2 side are defined together with a Y direction as a direction perpendicular to both the X direction and the Z direction.

The first mechanism part 21 of the present embodiment includes the linear motion mechanism 210, a parking rod 212, a spring 214, and a support member 216.

The linear motion mechanism 210 converts the rotational output from the electric motor 10 into a linear motion in the X direction. In the present embodiment, the linear motion mechanism 210 is a slide screw mechanism, but may be formed by a ball screw mechanism. The linear motion mechanism 210 includes the output member 2100 for extracting motion in the X direction as an output. In the present embodiment, on an X direction X2 side thereof, the output member 2100 has an end surface 2102 perpendicular to the X direction. The end surface 2102 of the output member 2100 is formed with a flat plane, but may have irregularities or the like.

In the linear motion mechanism 210, when the electric motor 10 rotates in the first direction, the end surface 2102 of the output member 2100 moves toward the X1 side, and when the electric motor 10 rotates in the second direction (opposite to the first direction), the end surface 2102 of the output member 2100 moves toward the X2 side.

The parking rod 212 faces the output member 2100 of the linear motion mechanism 210 in the X direction. In the present embodiment, the parking rod 212 is disposed on the X2 side of the output member 2100. An end surface 2122 of the parking rod 212 can come into contact with the end surface 2102 of the output member 2100 of the linear motion mechanism 210 in the X direction. In a state where the parking rod 212 and the output member 2100 of the linear motion mechanism 210 are in contact with each other in the X direction, force in the X direction can be transmitted via contact surfaces of the end surfaces 2102 and 2122. In the present embodiment, on an X direction X1 side thereof, the parking rod 212 has the end surface 2122 perpendicular to the X direction. The end surface 2122 of the parking rod 212 is formed with a flat plane, but may have irregularities or the like.

In the present embodiment, the parking rod 212 includes two rollers 2124 and 2126. The rollers 2124 and 2126 have rotary shafts 80 and 81 in the Y direction. The rotary shaft 80 is supported by the parking rod 212 so as to be movable in the X direction integrally with the parking rod 212. In this case, the rollers 2124 and 2126 are movable in the X direction together with the parking rod 212 while rotating about the rotary shafts 80 and 81, respectively.

Specifically, the rollers 2124 and 2126 are movable in the X direction between a lock position on the X1 side as shown in FIG. 3 and an unlock position on the X2 side as shown in FIG. 5. Hereinafter, such a range in which the rollers 2124 and 2126 move in the X direction is also referred to as a "predetermined stroke range". By using such rollers 2124 and 2126, force required for movement of the parking rod 212 can be reduced.

The two rollers 2124 and 2126 are preferably disposed at the same X-direction position, in contact with each other in the vertical direction, and capable of transmitting force in the vertical direction to each other.

Of the two rollers 2124 and 2126, the roller 2124 on the upper side comes into contact with a lower surface (a lower surface of which normal direction is the Z direction) of the support member 216 described later, in the vertical direction. Therefore, upward displacement of the two rollers 2124 and 2126 is restricted mainly by the support member 216 via the roller 2124. The roller 2124 on the upper side can roll on the lower surface of the support member 216 while being in contact with the lower surface.

Of the two rollers 2124 and 2126, the roller 2126 on the lower side comes into contact with an upper-side side surface of the parking pawl 42 in the vertical direction, and can roll on the upper-side side surface of the parking pawl 42. The roller 2126 cooperates with the parking pawl 42 to change force in the vertical direction acting on the parking rod 212 including the two rollers 2124 and 2126.

Specifically, when the rollers 2124 and 2126 are in the lock position (refer to FIG. 3), the roller 2126 strengthens the force F1 downward for rotating about a rotary shaft 420, due to a shape of the upper-side side surface of the parking pawl 42 (a shape as viewed in the Y direction). The force F1 downward acts to rotate the parking pawl 42 to a lock position (a position at which the parking pawl 42 meshes with the parking gear 41). The parking pawl 42 is biased around the rotary shaft 420 by a spring 422. The spring 422 biases the parking pawl 42 to rotate to an unlock position. When the force F1 downward is strengthened and exceeds reaction force due to biasing force of the spring 422, the parking pawl 42 rotates to the lock position (the position at which the parking pawl 42 meshes with the parking gear 41).

When the rollers 2124 and 2126 are in the unlock position (refer to FIG. 5), the roller 2126 weakens the force F1 downward for rotating about the rotary shaft 420 (that is, the force F2 shown in FIG. 2 is generated), due to the shape of the upper-side side surface of the parking pawl 42 (the shape as viewed in the Y direction). When the force F1 downward is weakened and falls below the reaction force due to the biasing force of the spring 422, the parking pawl 42 rotates to the unlock position (the position away from the parking gear 41).

According to the position in the X direction thereof, the parking rod 212 including such two rollers 2124 and 2126 can change the magnitude of the force in the vertical direction acting on the parking pawl 42.

The spring 214 biases the parking rod 212 toward the X1 side. Biasing force by the spring 214 may be adapted to be able to maintain the locked state of the parking gear 41 under an appropriate condition. For example, the biasing force by the spring 214 is adapted so that unintended release (transition of the parking gear 41 from the locked state to the unlocked state) caused by input due to disturbance or the like does not occur.

The support member 216 is fixed to a structure (not shown) on a vehicle body side. The support member 216 supports the parking rod 212 in such a manner that the parking rod 212 is linearly movable in the X direction. The support member 216 may have guide holes 2142 that allow the rollers 2124 and 2126 to move in the predetermined stroke range while supporting the rotary shafts 80 and 81. For example, the support member 216 may be a bracket that supports both Y-direction ends of the rotary shafts 80 and 81, and may be in a form of a bracket having side surfaces with the guide holes 2142 (side surfaces of which normal direction is the Y direction).

In the present embodiment, an X1-side boundary position of the predetermined stroke range of the rollers 2124 and 2126 corresponds to a position at which displacement of the rollers 2124 and 2126 toward the X1 side is locked by the guide holes 2142. That is, the guide holes 2142 form the X1-side boundary position of the predetermined stroke range of the rollers 2124 and 2126. However, in a modification, the support member 216 may be provided with another stopper structure. A similar may apply to an X2-side boundary position of the predetermined stroke range of the rollers 2124 and 2126.

The support member 216 supports the spring 214. Specifically, the support member 216 includes a seat 2160 (refer to FIG. 4) on the X direction X2 side. The seat 2160 supports an X-direction X2-side end of the spring 214 of which coil axis extends in the X direction. In this case, from the X direction X2 side, an X-direction X1-side end of the spring 214 comes into contact with a seat 2120 (refer to FIG. 4) of the parking rod 212. The spring 214 extends and contracts in the X direction between the seat 2120 of the parking rod 212 and the seat 2160 of the support member 216, thereby generating the biasing force described above.

Here, in the present embodiment, as described above, when the parking gear 41 is in the locked state (refer to FIG. 3), the gap Δ is formed in the first mechanism part 21 in such a manner that the electric motor 10 is mechanically separated from the second mechanism part 22. Specifically, the gap Δ is formed between the end surface 2102 on the X2 side of the output member 2100 of the linear motion mechanism 210 and the end surface 2122 on the X1 side of the parking rod 212. As a result, the effects as described above can be obtained.

Next, operation of the parking lock device 1 including the first mechanism part 21 of the present embodiment shown in FIGS. 3 to 5 will be overviewed.

In the locked state shown in FIG. 3, when the electric motor 10 is driven (when the electric motor 10 rotates in the first direction), the output member 2100 of the linear motion mechanism 210 moves toward the X2 side. As a result, the gap Δ between the end surface 2102 on the X2 side of the output member 2100 of the linear motion mechanism 210 and the end surface 2122 on the X1 side of the parking rod 212 approaches zero. When the electric motor 10 is further driven and the gap Δ disappears, the output member 2100 of the linear motion mechanism 210 and the parking rod 212 come into contact with each other in the X direction. Then, when the electric motor 10 is further driven, the output member 2100 and the parking rod 212 integrally move toward the X2 side, opposing the biasing force from the spring 422. At this time, the rollers 2124 and 2126 also move toward the X2 side integrally with the parking rod 212. When the rollers 2124 and 2126 move toward the X2 side, the force F1 is weakened as described above, the parking pawl 42 rotates (rotates clockwise around the rotary shaft 420 in FIG. 3 and the like), and transition from the locked state to the unlocked state is achieved.

Although not shown in FIGS. 3 to 5, the second mechanism part 22 (refer to FIG. 1 and the like) includes a member (not shown) connected to the parking rod 212, in such a manner capable of moving the parking rod 212 toward the X2 side. That is, the second mechanism part 22 may include a mechanism (for example, a link mechanism) that moves the parking rod 212 toward the X2 side. In this case, when an input from the second mechanism part 22 is generated, the parking pawl 42 rotates with movement similar to drive by the electric motor 10 described above, and the transition from the locked state to the unlocked state is achieved. That is, manual switching to the unlocked state (release of the locked state) is achieved.

In the unlocked state shown in FIG. 5, when the electric motor 10 is driven (when the electric motor 10 rotates in the second direction), the output member 2100 of the linear motion mechanism 210 moves toward the X1 side. At this time, the parking rod 212 (and the rollers 2124 and 2126) also moves toward the X1 side integrally with the output member 2100 by the biasing force of the spring 422. Then, when the roller 2126 on the lower side gets over a protrusion shape of the upper-side side surface of the parking pawl 42, the force F1 is strengthened, the parking pawl 42 rotates (rotates counterclockwise around the rotary shaft 420 in FIG. 5 and the like), and transition from the unlocked state to the locked state is achieved.

In such a locked state (refer to FIG. 3), the rollers 2124 and 2126 engage with an X1-side end of the guide holes 2142, and further displacement toward the X1 side is restricted. In the present embodiment, the electric motor 10 is further driven after the locked state is formed. In this case, of the output member 2100 of the linear motion mechanism 210 and the parking rod 212, the output member 2100 alone moves toward the X1 side, and the output member 2100 is separated from the parking rod 212 to form the above-described gap Δ.

Here, the gap Δ described above may be formed immediately after such a locked state is formed. That is, the gap Δ described above may be formed in a series of movements for forming the locked state of the parking rod 212. Alternatively, the gap Δ described above may be formed after a relatively long time has elapsed after such a locked state is formed.

In the present embodiment, the rollers 2124 and 2126 engage with the X1-side end of the guide holes 2142 at the same time as the locked state of the parking rod 212 is formed. However, the rollers 2124 and 2126 may engage with the X1-side end of the guide holes 2142 when the rollers 2124 and 2126 further move toward the X1 side after the locked state of the parking rod 212 is formed. In this case also, the above-described gap Δ can be formed by further driving the electric motor 10.

Next, a control system of the electric motor 10 will be described with reference to FIGS. 6 and 7.

Figure 6:
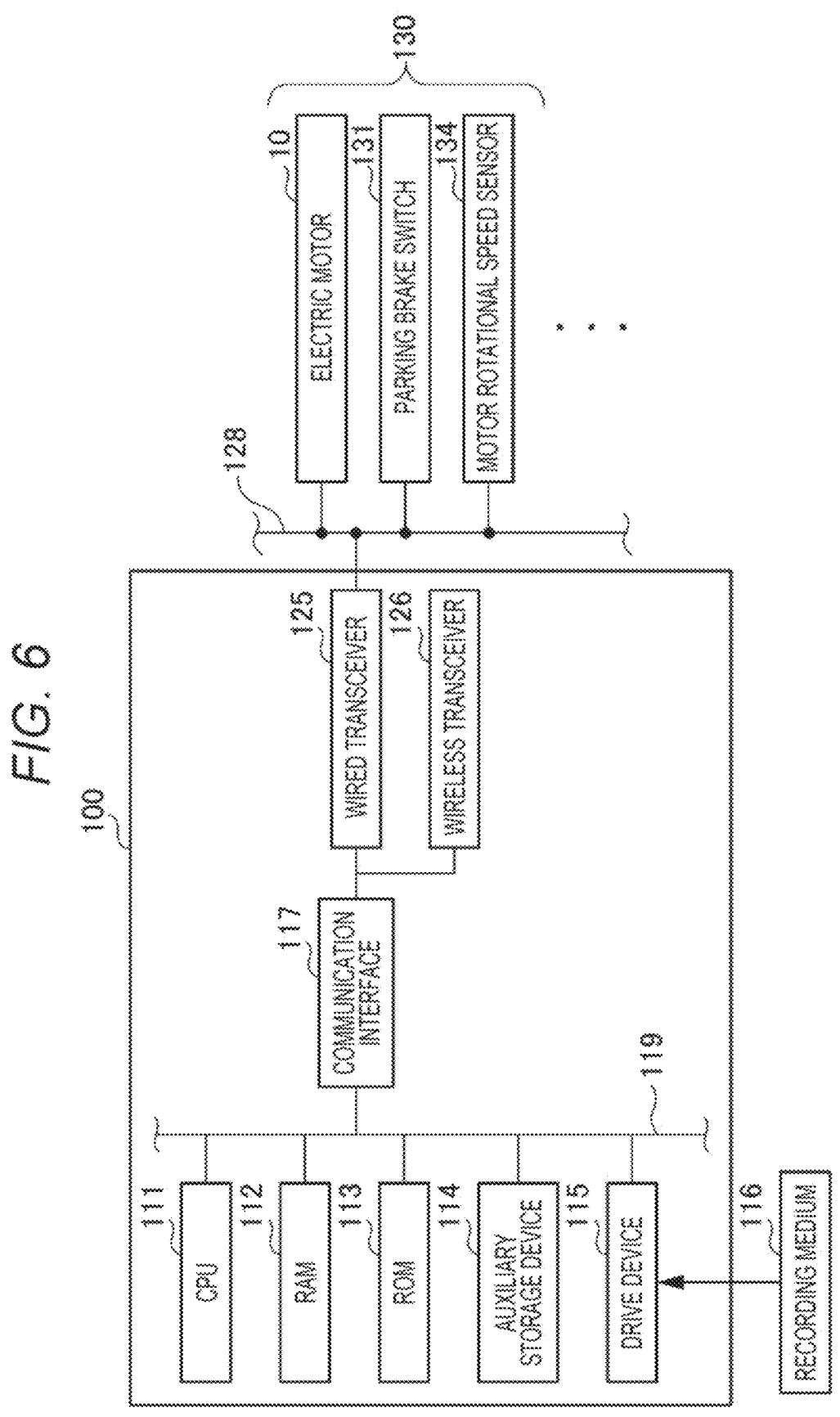
FIG. 6 is a diagram showing an example of a configuration of hardware of a control device of the parking lock device.

FIG. 6 is a diagram showing an example of a configuration of hardware of a control device 100 of the parking lock device 1. The control device 100 controls the parking lock device 1 by controlling the electric motor 10.

FIG. 6 schematically shows other vehicle-mounted electronic devices 130 in association with the configuration of the hardware of the control device 100.

The other vehicle-mounted electronic devices 130 may include various sensors, such as a parking brake switch 131 or a motor rotational speed sensor 134, or the like, in addition to the electric motor 10.

The parking brake switch 131 generates an operation signal for achieving release of the locked state (transition to the unlocked state) of the parking gear 41. The motor rotational speed sensor 134 generates a signal corresponding to rotational speed of the electric motor 10.

The control device 100 includes a central processing unit (CPU) 111, random access memory (RAM) 112, read only memory (ROM) 113, auxiliary storage device 114, drive device 115, and communication interface 117 connected by a bus 119, and a wired transceiver 125 and wireless transceiver 126 connected to the communication interface 117.

The auxiliary storage device 114 is, for example, a hard disk drive (HDD), a solid state drive (SSD), or the like, and is a storage device that stores data related to application software or the like.

The wired transceiver 125 includes a transceiver capable of performing communication by using a wired network 128 based on a protocol such as a controller area network (CAN) or a local interconnect network (LIN). The other vehicle-mounted electronic devices 130 are connected to the wired transceiver 125. However, some or all of the other vehicle-mounted electronic devices 130 may be connected to the bus 119.

The control device 100 may be connectable to a recording medium 116. The recording medium 116 stores a predetermined program. The program stored in the recording medium 116 is installed in, for example, the auxiliary storage device 114 of the control device 100 via the drive device 115. The installed predetermined program can be executed by the CPU 111 of the control device 100. For example, the recording medium 116 may be a recording medium, such as a compact disc (CD)-ROM, a flexible disk, or a magneto-optical disk, that optically, electrically, or magnetically records information, or may be a semiconductor memory, such as a ROM or a flash memory, that electrically records information.

Figure 7:
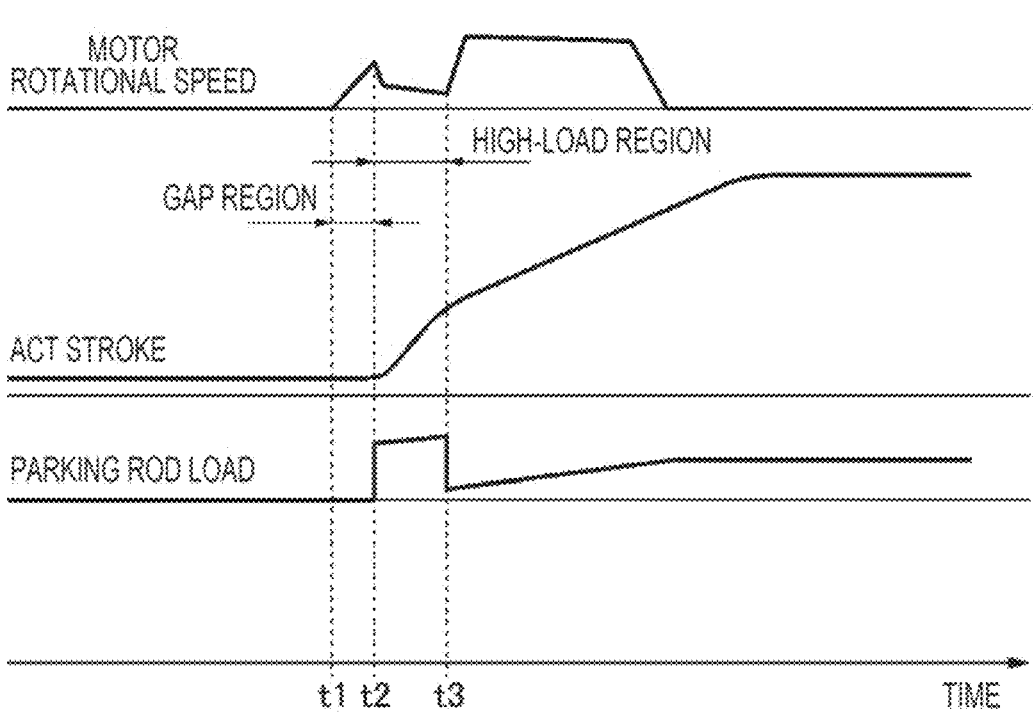
FIG. 7 is an explanatory diagram showing an example of preferable drive (example of control) of an electric motor at a time of transition from the locked state to the unlocked state.

FIG. 7 is an explanatory diagram showing an example of preferable drive (example of control) of the electric motor 10 at a time of transition from the locked state to the unlocked state.

FIG. 7 is a diagram showing time-series changes in various parameters when the electric motor 10 is controlled at a time of the transition from the locked state to the unlocked state. FIG. 7 shows, from top, motor rotational speed, stroke of the parking rod 212 (described as "ACT stroke" in the figure), and load of the parking rod 212 ("parking rod load" in the figure).

In the example shown in FIG. 7, driving of the electric motor 10 for the transition from the locked state to the unlocked state is started at time t1. The rotational speed of the electric motor 10 is increased by using a section of the gap Δ described above. In this case, the rotational speed of the electric motor 10 may preferably be increased to a maximum. As a result, the output member 2100 of the linear motion mechanism 210 can be brought into contact with the parking rod 212 at a relatively high speed, and initial movement of the parking rod 212 can be facilitated.

At time t2, the output member 2100 of the linear motion mechanism 210 hits the parking rod 212, and the movement (stroke) of the parking rod 212 toward the X2 side is started. Accordingly, the load rapidly increases. The section in which the parking rod 212 starts to move toward the X2 side is a high-load region with large load. In the present embodiment, as described above, the output member 2100 of the linear motion mechanism 210 can be relatively swiftly brought into contact with the parking rod 212 by using the gap Δ. Therefore, the parking rod 212 can be moved toward the X2 side also in the high-load region. When the high-load region ends, the rotational speed of the electric motor 10 increases from time t3, and the parking rod 212 quickly moves toward the X2 side.

When the movement of the parking rod 212 toward the X2 side is stopped due to high load, the electric motor 10 may be driven again after being rotated in a reverse direction to form the gap Δ again. In this case, the output from the electric motor 10 may be increased from a first drive.

Thus, according to the present embodiment, by forming the above-described gap Δ, as described above, it is possible to facilitate the initial movement of the parking rod 212 toward the X2 side based on the output from the electric motor 10, while reducing the operation force required when manually switching from the locked state to the unlocked state.

Next, other embodiments that may be executed instead of the above-described embodiment will be described with reference to FIG. 8A and subsequent drawings. Hereinafter, the above-described embodiment will be referred to as a "first embodiment", and a second embodiment and subsequent embodiments, which are the other embodiments, will be described.

Figure 8A:
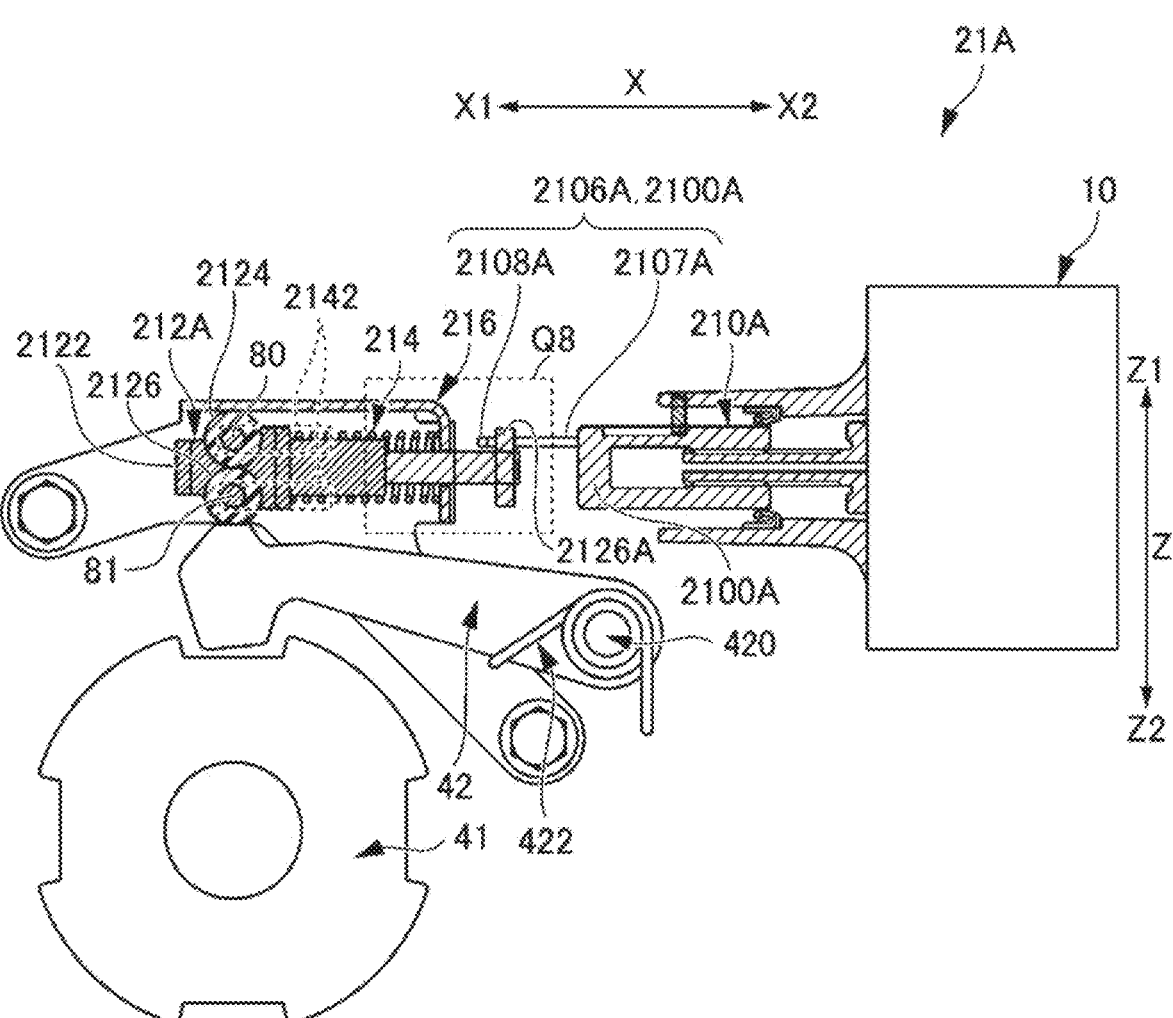
FIG. 8A is a view showing an example of a first mechanism part according to a second embodiment (locked state)
Figure 8B:
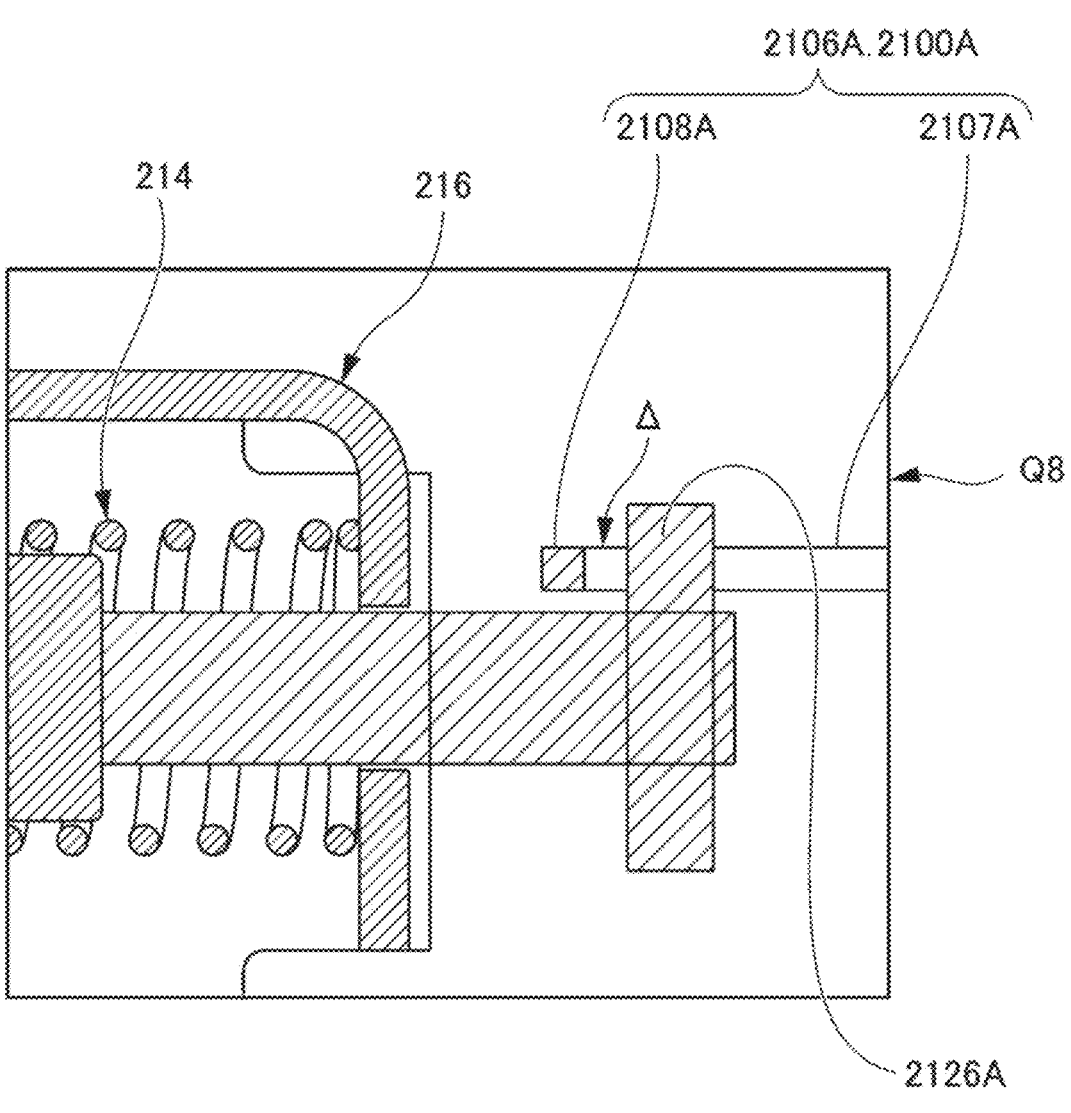
FIG. 8B is an enlarged view of a portion Q8 in FIG. 8A.
Figure 9:
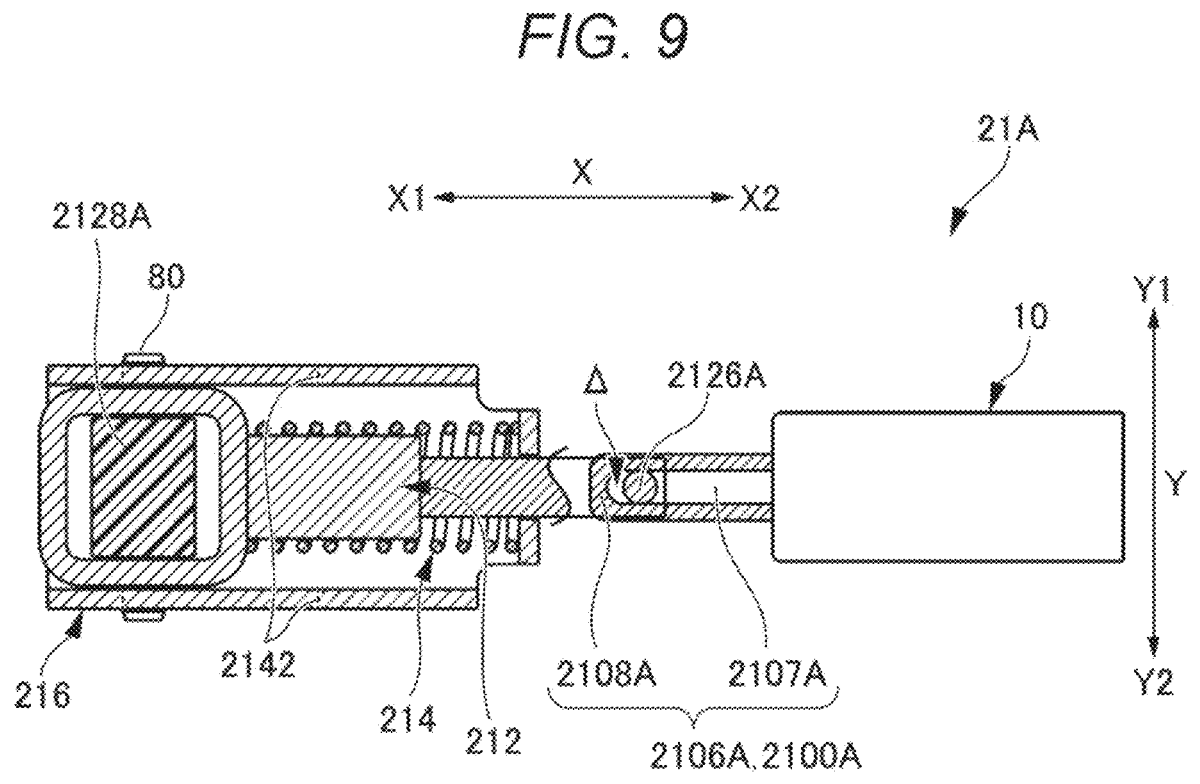

FIG. 8A is an explanatory diagram of a first mechanism part 21A according to the second embodiment, and is a diagram corresponding to FIG. 3 according to the first embodiment. FIG. 8B is an enlarged view of a portion Q8 in FIG. 8A. FIG. 9 is a plan view of a main part of the first mechanism part 21A as viewed from top. FIG. 8A shows an electric motor 10, a parking pawl 42, and the like together with the first mechanism part 21A. FIG. 9 shows the electric motor 10 together with the first mechanism part 21A.

The first mechanism part 21A according to the second embodiment is different from the first mechanism part 21 according to the first embodiment described above in that the linear motion mechanism 210 and the parking rod 212 are replaced with a linear motion mechanism 210A and a parking rod 212A, respectively.

The linear motion mechanism 210A is different from the linear motion mechanism 210 according to the first embodiment described above in that the output member 2100 is replaced with an output member 2100A. The linear motion mechanism 210A is disposed on an X2 side with respect to the parking rod 212A and a support member 216 together with the electric motor 10.

The output member 2100A is different from the output member 2100 according to the first embodiment described above in having an engaging unit 2106A.

The parking rod 212A is different from the parking rod 212 according to the first embodiment described above in having an engaged unit 2128A.

The engaging unit 2106A can engage with the engaged unit 2128A in such a manner capable of transmitting force toward an X direction X2 side. In the examples shown in FIGS. 8A, 8B, and 9, the engaging unit 2106A includes a groove 2107A extending in an X direction and a locking part 2108A. The locking part 2108A forms an X1-side end of the groove 2107A. The engaged unit 2128A is in a form of a protrusion fitted into the groove 2107A, and is movable in the X direction along the groove 2107A. In this case, in a state where the engaged unit 2128A is in contact with the locking part 2108A in the X direction, the engaging unit 2106A can transmit, to the engaged unit 2128A, the force toward the X direction X2 side.

In the present embodiment also, similarly to the above-described first embodiment, a second mechanism part 22 (not shown) includes a member (not shown) connected to the parking rod 212A in such a manner capable of moving the parking rod 212A toward the X2 side.

In the present embodiment also, when a parking gear 41 is in a locked state, a gap Δ is formed in the first mechanism part 21A in such a manner that the electric motor 10 is mechanically separated from the second mechanism part 22 (not shown). Specifically, the gap Δ in the X direction is formed between the engaging unit 2106A of the output member 2100A of the linear motion mechanism 210A and the engaged unit 2128A of the parking rod 212A. As a result, an effect similar to an effect of the first embodiment described above can be obtained.

Figure 10:
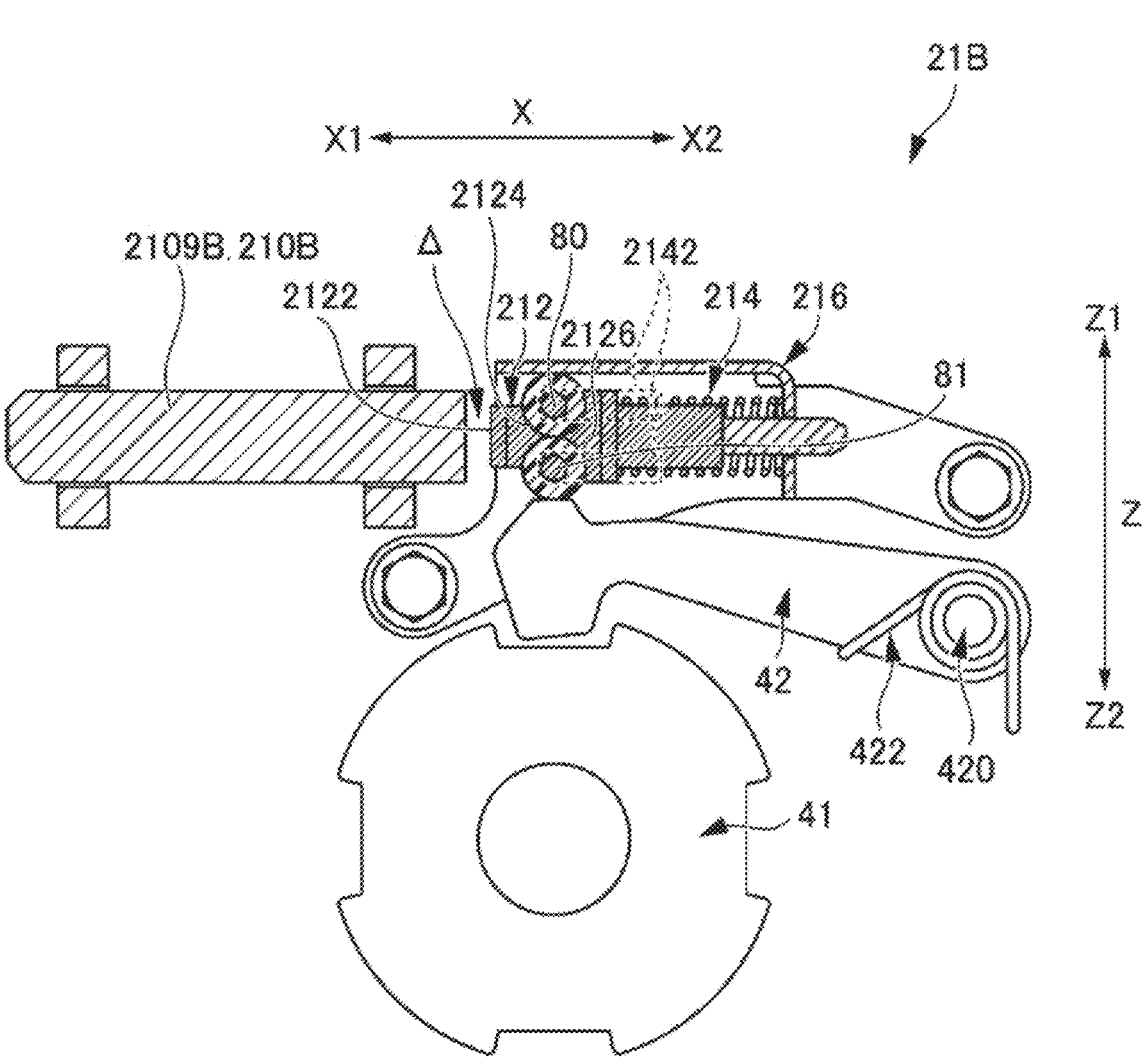
FIG. 10 is a view showing an example of a first mechanism part according to a third embodiment (locked state)
Figure 11:
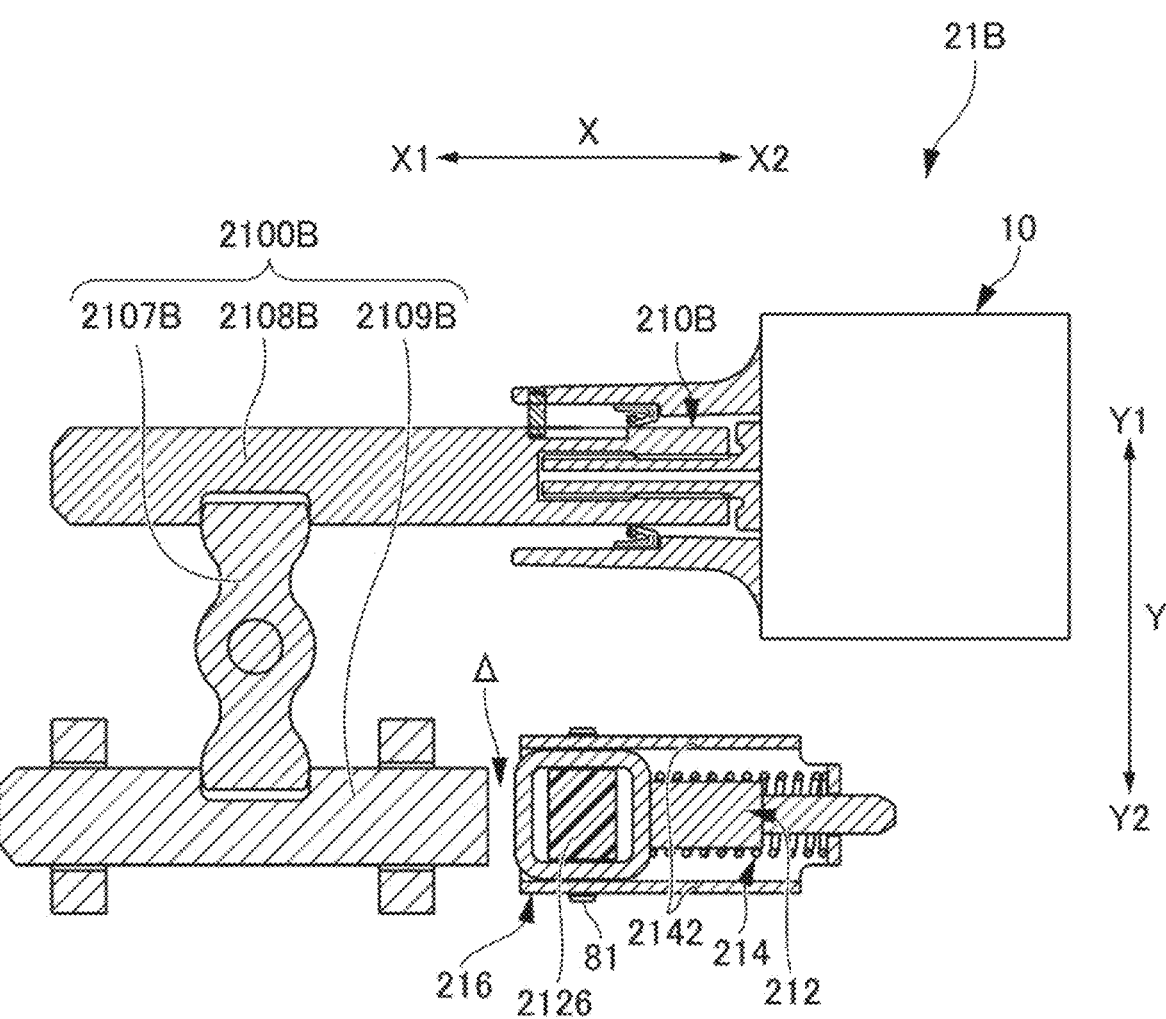
FIG. 11 is a plan view of a main part of the first mechanism part according to the third embodiment, as viewed from below.

FIG. 10 is an explanatory diagram of a first mechanism part 21B according to a third embodiment, and is a diagram corresponding to FIG. 3 according to the third embodiment. FIG. 11 is a plan view of a main part of the first mechanism part 21B as viewed from below. FIG. 10 shows an electric motor 10, a parking pawl 42, and the like together with the first mechanism part 21B.

In the third embodiment, disposition of the electric motor 10 is different from disposition of the electric motor 10 in the first embodiment described above. Specifically, in the first embodiment described above, the electric motor 10 is disposed in series (coaxially) with the parking rod 212, whereas in the third embodiment, the electric motor 10 is disposed in parallel with a parking rod 212. Specifically, in the third embodiment, a rotation axis of the electric motor 10 is parallel to a central axis of the parking rod 212, but is offset in a Y direction.

The first mechanism part 21B according to the third embodiment is different from the first mechanism part 21 according to the first embodiment described above in that the linear motion mechanism 210 is replaced with a linear motion mechanism 210B.

The linear motion mechanism 210B is different from the linear motion mechanism 210 according to the first embodiment described above in that the output member 2100 is replaced with an output member 2100B.

The output member 2100B is different from the output member 2100 according to the first embodiment described above in having a link structure. Specifically, the output member 2100B includes two movable members 2108B and 2109B linked via a link arm 2107B. The movable member 2108B is disposed coaxially with the linear motion mechanism 210B. In this case, when the movable member 2108B linearly moves toward an X1 side, the movable member 2109B linearly moves toward an X2 side by action of the link arm 2107B. Similarly to the output member 2100 according to the first embodiment described above, the movable member 2109B is disposed in series (coaxially) with the parking rod 212. The movable member 2109B serves a function similar to a function of the output member 2100 according to the first embodiment described above.

In the present embodiment also, similarly to the above-described first embodiment, a second mechanism part 22 (not shown) includes a member (not shown) connected to the parking rod 212 in such a manner capable of moving the parking rod 212 toward the X2 side.

In the present embodiment also, when a parking gear 41 is in a locked state, a gap Δ is formed in the first mechanism part 21B in such a manner that the electric motor 10 is mechanically separated from the second mechanism part 22 (not shown). Specifically, the gap Δ in the X direction is formed between the movable member 2109B of the output member 2100B of the linear motion mechanism 210B and the parking rod 212. As a result, an effect similar to an effect of the first embodiment described above can be obtained.

Although each embodiment has been described in detail above, this disclosure is not limited to a specific embodiment, and various modifications and changes can be made within the scope described in the claims. Furthermore, all or a plurality of the components in the above-described embodiments can be combined.

For example, in each of the embodiments described above, the gap Δ is always formed (that is, maintained) when the parking gear 41 is in the locked state. However, this disclosure is not limited thereto. For example, when release of the locked state of the parking gear 41 is instructed, transition to the unlocked state as described above may be achieved after the gap Δ is formed.

In each of the embodiments described above, as a preferable example, the gap Δ is formed when the parking gear 41 is in the locked state. However, the gap Δ may not be formed. That is, the gap Δ=0 may hold. In this case also, it is possible to reduce operation force required when manually switching from the locked state to the unlocked state. This is because the output member 2100 of the linear motion mechanism 210 and the parking rod 212 are separate bodies, and a direction in which the parking rod 212 moves for transition from the locked state to the unlocked state is a direction in which the parking rod 212 moves away from the output member 2100.

A parking lock device includes: an electric motor; and a mechanism including a lock member configured to detachably engage with a parking gear and operate on the basis of an output from the electric motor. The mechanism includes a first mechanism part configured to switch a state of the parking gear between a locked state and an unlocked state by moving the lock member on the basis of an output from the electric motor, and a second mechanism part configured to switch a state of the parking gear from a locked state to an unlocked state by moving the lock member on the basis of an external input generated manually. When the parking gear is in a locked state, in the first mechanism part, a relation between the second mechanism part and the electric motor is switchable between connection and disconnection with the second mechanism part on the basis of an output from the electric motor.

According to the above configuration, in the parking lock device, it is possible to reduce an operation force required for manually switching from the locked state to the unlocked state while reducing the number of parts.

In the parking lock device, the first mechanism part includes a linear motion mechanism configured to convert a rotational output from the electric motor into a linear motion in a first direction, and a movable member facing an output member of the linear motion mechanism in the first direction and configured to linearly move in the first direction on the basis of an input in the first direction received from the linear motion mechanism. The lock member operates on the basis of a linear motion of the movable member in the first direction. The second mechanism part is configured to cause the movable member to generate a linear motion in the first direction on the basis of the external input. When the parking gear is in a locked state, a gap for making a relation between the second mechanism part and the electric motor disconnected is formed between the movable member and an output member of the linear motion mechanism in the first direction on the basis of an output from the electric motor.

In the parking lock device, the first mechanism part is configured to change, on the basis of a linear motion of the movable member in the first direction, force in a second direction intersecting in the first direction, the force acting on the lock member, and the lock member is configured to switch a state of the parking gear from an unlocked state to a locked state on the basis of a change in force in the second direction.

The parking lock device further includes a control device configured to control the electric motor. The control device is configured to eliminate the gap and apply an input to the movable member in the first direction by moving an output member of the linear motion mechanism along the first direction via the electric motor, in a case of switching a state of the parking gear from a locked state to an unlocked state.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A parking lock device comprising:

an electric motor; and a mechanism including a lock member configured to detachably engage with a parking gear and operate on the basis of an output from the electric motor, wherein the mechanism includes a first mechanism part configured to switch a state of the parking gear between a locked state and an unlocked state by moving the lock member on the basis of the output from the electric motor, and a second mechanism part configured to switch the state of the parking gear from the locked state to the unlocked state by moving the lock member on the basis of an external input generated manually, when the parking gear is in the locked state, in the first mechanism part, a relation between the second mechanism part and the electric motor is switchable between connection and disconnection with the second mechanism part on the basis of the output from the electric motor, the first mechanism part includes a linear motion mechanism configured to convert a rotational output from the electric motor into a linear motion in a first direction, and a movable member facing an output member of the linear motion mechanism in the first direction and configured to linearly move in the first direction on the basis of an input in the first direction received from the linear motion mechanism, the lock member operates on the basis of a linear motion of the movable member in the first direction, the second mechanism part is configured to cause the movable member to generate a linear motion in the first direction on the basis of the external input, and when the parking gear is in the locked state, a gap for making a relation between the second mechanism part and the electric motor disconnected is formed between the movable member and the output member of the linear motion mechanism in the first direction on the basis of the output from the electric motor.

2. The parking lock device according to claim 1, wherein the first mechanism part is configured to change, on the basis of the linear motion of the movable member in the first direction, force in a second direction intersecting in the first direction, the force acting on the lock member, and the lock member is configured to switch a state of the parking gear from the unlocked state to the locked state on the basis of a change in force in the second direction.

3. The parking lock device according to claim 2, further comprising a control device configured to control the electric motor, wherein the control device is configured to eliminate the gap and apply an input to the movable member in the first direction by moving the output member of the linear motion mechanism along the first direction via the electric motor, in a case of switching the state of the parking gear from the locked state to the unlocked state.

4. The parking lock device according to claim 1, further comprising a control device configured to control the electric motor, wherein the control device is configured to eliminate the gap and apply an input to the movable member in the first direction by moving the output member of the linear motion mechanism along the first direction via the electric motor, in a case of switching the state of the parking gear from the locked state to the unlocked state.

* * * * *